United States Patent [19]
Page

[11] 3,759,286
[45] Sept. 18, 1973

[54] APPARATUS FOR MAINTAINING THE WATER LEVEL WITHIN A SWIMMING POOL TO PREDETERMINED LIMITS

[76] Inventor: Littleton Dennis Page, Rt. 2, Box 798, Tucson, Ariz. 85715

[22] Filed: Jan. 26, 1972

[21] Appl. No.: 220,976

[52] U.S. Cl. ............................... 137/392, 4/172.17
[51] Int. Cl. ............................................. G05d 9/12
[58] Field of Search.................... 137/213, 214, 386, 137/392, 428, 429, 433; 210/103, 104, 169; 73/290 R, 304 R, 319; 4/172, 172.17; 141/95; 417/211.5

[56] References Cited
UNITED STATES PATENTS

| | | | |
|---|---|---|---|
| 2,790,459 | 4/1957 | Thomas | 137/412 |
| 3,428,072 | 2/1969 | Welch | 137/392 X |
| 3,537,111 | 11/1970 | Whitten Jr. | 4/172.17 |
| 3,596,673 | 8/1971 | Laucournet | 137/392 X |

Primary Examiner—Martin P. Schwadron
Assistant Examiner—David R. Matthews
Attorney—William C. Cahill et al.

[57] ABSTRACT

In order to maintain the water level of a swimming pool within predetermined limits, an electrically operated valve connected between a source of make up water and the pool is opened whenever the water falls below a first predetermined level and is closed whenever the water reaches a second, higher predetermined level. Water level detection is carried out in a vertically disposed sensing tube in liquid communication with a point in the return line of the filtering circuit. A plurality of vertically separated conductive probes extend into the sensing tube to provide water level information according to conduction paths set up between a lowermost, common probe and those of the other probes which are below the water level. When the recirculating pump is not in operation, the water level reflects the water level in the pool. When the pump is energized, the pressure in the return line rises such that the sensing tube fills completely and thus automatically prevents operation of the valve inasmuch as an artificial high level condition is detected by the circuit coupled to the level sensing probes.

2 Claims, 6 Drawing Figures

3,759,286
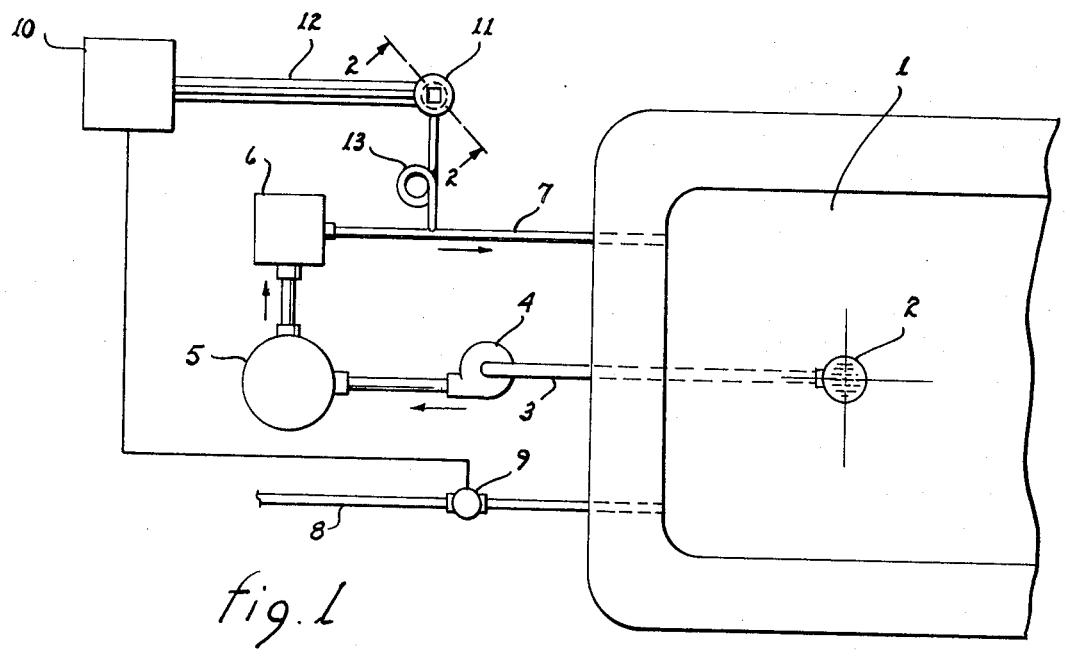
fig. 1
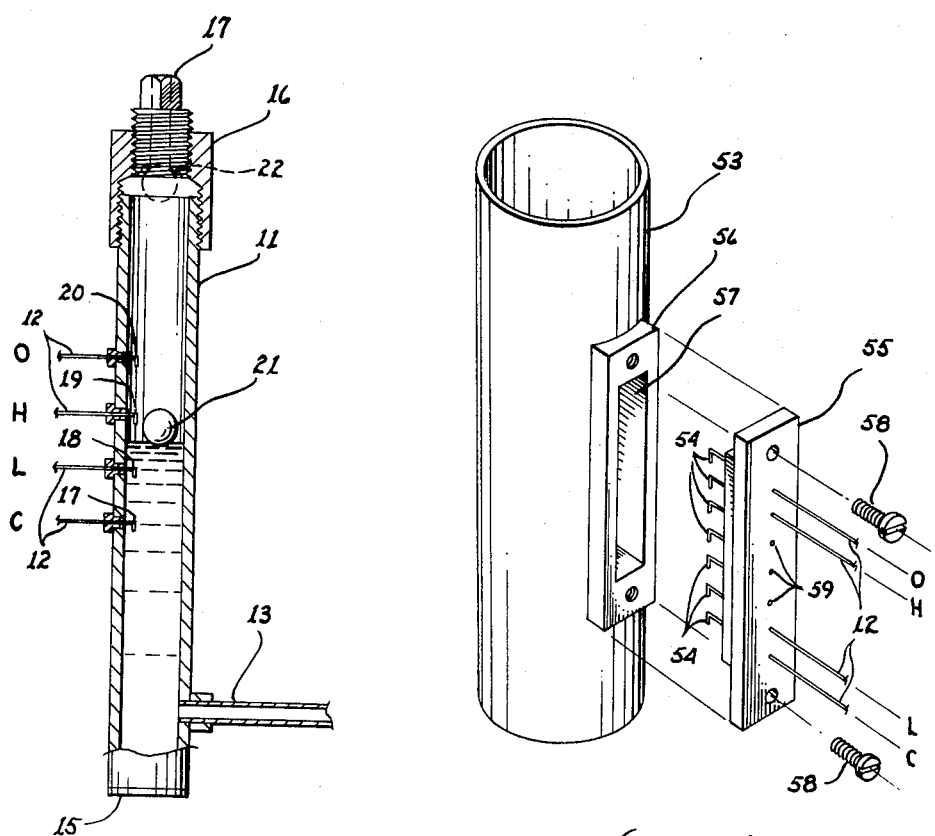
fig. 2
fig. 4

APPARATUS FOR MAINTAINING THE WATER LEVEL WITHIN A SWIMMING POOL TO PREDETERMINED LIMITS

This invention relates to the liquid level control arts, more particularly to apparatus for maintaining the water level in a swimming pool within predetermined maximum and minimum levels.

The water level within a swimming pool should be kept within a rather narrow range in order that the skimming portion of the recirculating and filtering apparatus will function properly. This level is usually maintained by simply observing the water level and supplying make up water from a line source with a manually operated valve. However, because the volume of water necessary to make up even a slightly low level is considerable, the time necessary to bring the water to the desired level may run several hours, a circumstance which renders the task unpleasant and, additionally, brings about the possibility of overfilling due to failure to monitor the progress of the operation carefully enough. Thus, it will be apparent that it would be highly desirable to provide automatic means for maintaining the water level of the swimming pool within predetermined maximum and minimum limits without the need for manual supervision or intervention.

It is therefore a broad object of my invention to provide means for automatically maintaining the water level within a swimming pool.

It is another object of my invention to provide such means which may be readily incorporated into existing, as well as new, swimming pools.

It is still another object of my invention to provide such means which are safe, reliable in operation, and economical both in manufacture and in installation.

It is yet another object of my invention to provide such apparatus which constitutes a differential water level control to mitigate scum and/or mineral build-up of the type encountered with single level control apparatus.

The subject matter of the invention is particularly pointed out and distinctly claimed in the concluding portion of the specification. The invention, however, both as to organization and method of operation, may best be understood by reference to the following description taken in connection with the accompanying drawings of which:

FIG. 1 is a schematic representation of a swimming pool system incorporating the present invention;

FIG. 2 is a cross section of a sensing tube taken along the lines 2—2 of FIG. 1;

FIG. 4 is a partially cut away pictorial illustrating a variant sensing tube configuration;

Figure 3:
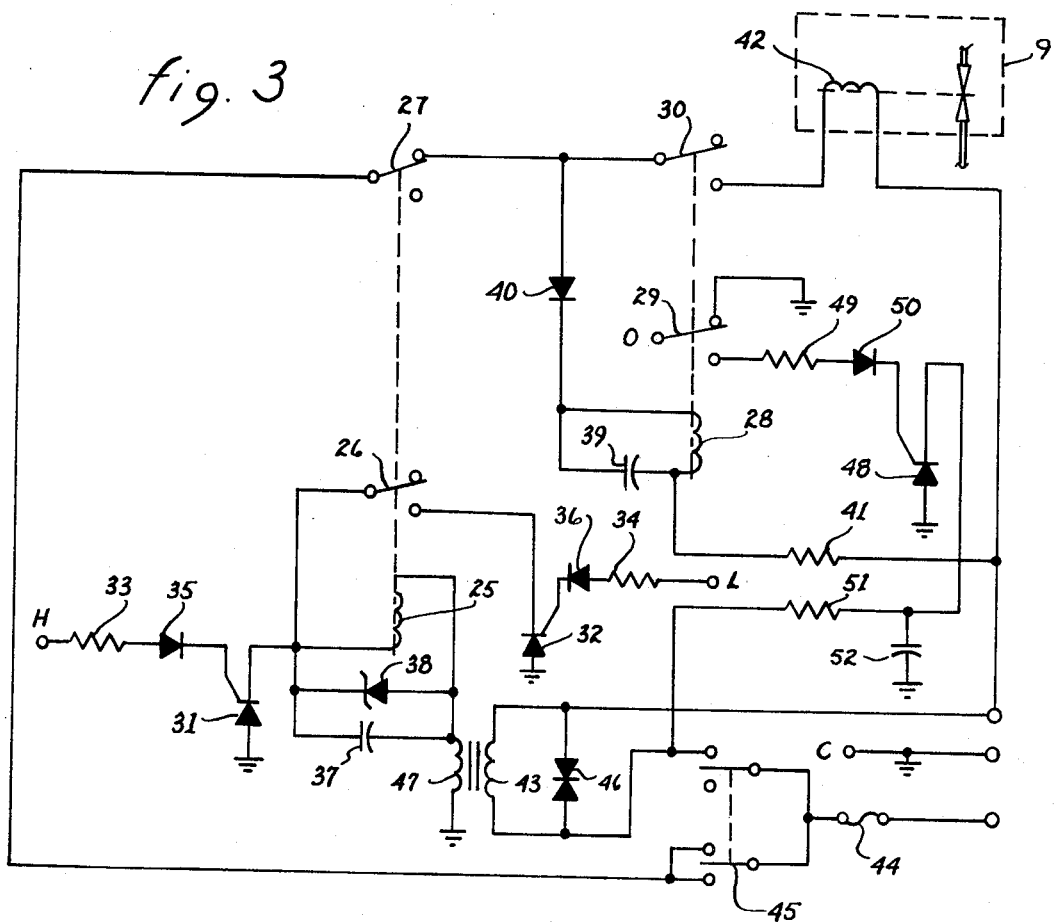
FIG. 3 is a schematic diagram of an exemplary level control circuit comprising part of the present invention.

Attention is now directed to FIG. 1 which illustrates a swimming pool 1 with the usual recirculating system for cleaning and conditioning the water, which system includes a main drain 2 (which may, of course, be supplemented by parallel circuits to other drains and skimmers), a suction line 3 to a pump 4 which forces water through a filter 5 and, if provided, a heater 6. The conditioned water flows back to the swimming pool 1 through a return line 7 which opens into the pool well below the normal water line. In practice, the return line 7 may open into the pool at a plurality of locations and may also feed whip-type cleaners.

Make up water is supplied to the swimming pool 1 through a make up line 8 which may be coupled to a conventional water source such as an ordinary city water main. Flow of make up water from the source into the swimming pool 1 is controlled by a normally closed electrically actuated valve 9. The valve 9 is selectively energized by the output from a level control circuit 10 which, in conjunction with a sensing tube 11 monitors the water level in the pool and permits make up water flow in accordance therewith to maintain the water level within predetermined limits. As will be explained more fully below, the level control circuit 10 is connected to a plurality of conductors 12 which are connected to a corresponding plurality of sensing probes (not shown in FIG. 1) in the sensing tube 11. The interior of the sensing tube 11 is placed into direct liquid communication with the return line 7 by means of a tube 13. The sensing tube 11 is vertically positioned such that a normal range of water level within the swimming pool 1 falls intermediate along its length, and the point 14 at which the tube 13 is connected to the return line 7 may conveniently be below the lowest expected water level in the pool although this is not absolutely necessary in a tight system. Therefore, when the pump 4 is not operating, the water level in the swimming pool 1 is accurately reflected into the sensing tube 11.

The structure of the sensing tube 11 may be better understood with reference to FIG. 2 in which it will be observed tha the lower end 15 of the sensing tube is sealed off, and the tube 13 is attached near the lower end. The upper end 16 of the sensing tube 11 is provided with a small aperture 17 which performs a venting function to permit the water level reflected into the sensing tube to fluctuate during normal operation. A plurality of vertically separated sensing probes 17, 18, 19 and 20 extend into the sensing tube and are connected to the level control circuit by means of the conductors 12 as previously noted. The lowermost probe 17 is a common probe, and level sensing is achieved by observing whether or not a conductive path is set up between it and a low water level probe 18 or a high water level probe 19 or an overflow water level probe 20. Briefly, should the water level in the sensing tube 11 fall below the low water level probe 18 to break the conductive path between the probes 17 and 18, the level control circuit 10 responds by energizing the electrically actuated valve 9 until the water level reaches the high water level probe 19 whereupon the flow of make up water is interrupted by de-energizing the electrically actuated valve 9. The overflow level probe 20 senses a condition in which the apparatus fails through malfunction to stop the flow of make up water and provides redundant sensing to prevent the water level from going any higher.

It will be noted that the water level reflected into the sensing tube 11 from the return line 7 is an accurate indication of the swimming pool water level only when the pump 4 is not operating. When the pump 4 is circulating water through the system, the pressure in the return line 7 is sufficiently high that the water level in the sensing tube 11 immediately becomes much higher than can be accommodated and would result in water being forced continually upwardly from the aperture 17 if some means is not provided to prevent this from taking place. Thus, a float 21 riding on top of the water within the sensing tube 11 functions to seal against a gasket means 22 disposed on the underside of the upper end 16 of the sensing tube 11 to seal off the aperture 17 whenever the pump 4 is operating.

Referring now to FIG. 3, an exemplary configuration for the level control circuit 10 is presented. The level control circuit includes a first relay having a coil 25 and first and second s.p.s.t. contact sets 26 and 27 which are shown in the de-energized position. Additionally, a second relay includes a coil 28 and first and second s.p.d.t. contact sets 29 and 30, also shown in the de-energized position. As will be explained more fully below, initial energization of the relay coil 25 is controlled by an SCR 31 with a latching circuit provided through the contact set 26 which brings holding SCR 32 into the coil 25 circuit. Because these SCR's 31 and 32 are a-c fired, resistors 33 and 34 are used in the usual manner to limit the peak gate current and the diodes 35 and 36 are provided to prevent inverse voltage from being applied between the cathode and gate electrodes during the reverse part of a cycle. Capacitor 37 is connected across the relay coil 25 for peaking purposes, and zener diode 38, also disposed across the coil, protects against possible excessive counter EMF developed when the circuit is turned off.

Similarly, relay coil 28 is shunted with a capacitor 39, and the use of a diode 40 and current limiting resistor 41 permit the use of a d-c relay coil 28 which simplifies the overall circuit arrangement. It will be noted that the solenoid coil 42 of the electrically actuated valve 9 is connected in series with, and is therefore controlled by the contact set 30.

Power is supplied from a conventional line source to the primary winding 43 of a stepdown transformer. A fuse 44 in series with one side of the line to the primary winding provides circuit overcurrent protection, and a d.p.d.t. switch 45 permits manual control of circuit energization in the obvious manner. A double diode 46 is connected in parallel across the primary winding 43 to absorb transient surges in excess of the forward breakdown voltages thereof. The secondary winding 47 of the transformer is connected in series with the relay coil 25 and is grounded at one to complete circuits to the anodes of the SCR's 31 and 32 as well as the other points marked with the ground symbol in the figures.

The overflow protection portion of the circuit includes another SCR 48 which has its gate electrode coupled to the normally opened contact of contact set 29 through resistor 49 and diode 50. The anode of the SCR 48 is grounded, and the cathode is connected through a current limiting resistor 51 to the fused side of the line. Additionally, a capacitor 52 is connected between the cathode of the SCR 48 and ground.

Referring both to FIGS. 2 and 3, the electrical connections between the probes 17, 18, 19 and 20 to the various points in the electrical circuit of FIG. 3 will be noted. Specifically, the common probe 17 is grounded; the low water level probe 18 is connected into the gate circuit of the SCR 32; the high water level sensing probe 19 is connected into the gate circuit of the SCR 31; and the overflow sensing probe 20 is connected into the gate circuit of the SCR 48. Consider now a condition in which the relay coil 25 is de-energized as shown in FIG. 3. Assuming the switch 45 is closed, the relay coil 28 will be energized through the contact set 27 and the electrically actuated valve 9 will have its solonoid coil 42 energized through the contact sets 27 and 30. Thus, this condition results in make up water being admitted to the pool, and the water level will continue to rise until it reaches the high water level probe 19 in the sensing tube 11 at which time a conductive path is set up between the probe 19 and the common probe 17 to place a ground potential on the gate electrode of the SCR 31 which thereupon fires in the a-c mode to energize relay coil 25. When the contact sets 26 and 27 change position, the circuit to the relay coil 28 and to the solonoid coil 42 are interrupted such that the contact sets 29 and 30 change position and the flow of make up water ceases.

Subsequently, as the normal water level in the pool drops over a period of time due to evaporation and other normal losses, the level reflected into the sensing tube 11 will first fall below the high water probe 19. However, the relay coil 25 will remain energized because of the latching circuit brought into series with the coil upon closure of the contact set 26. SCR 32 will fire as soon as the contacts 26 close since low water probe 18 is beneath the water level and therefore grounded. As the pool water level continues to drop, the level within the sensing tube 11 will eventually drop below the low water level probe 18 to break the conductive path set up through the water between it and the common probe 17. When this happens, the SCR 32 will be shut off and the resultant de-energization of the coil 25 will permit the contact sets 26 and 27 to assume the position shown in FIG. 3 once again which results in energization of the coil 28 to permit make up water to flow as previously described. Under normal operating conditions the cycle is repeated automatically to maintain the pool water level within nominal limits between the probes 18 and 19. It will be noted that whenever the pump 4 is energized to bring about an upward surge of the water level within the sensing tube 11, the apparatus automatically detects an artificial high water level condition to interrupt the flow of make up water.

Consider now a condition in which component failure or the like causes the relay coil 25 to remian de-energized. Should such failure occur, relay coil 28 would remain energized, and the electrically actuated valve 9 would remain open. Thus, the water level in the pool would continue to rise until the level in the sensing tube 11 reaches the overflow sensing probe 20. A ground potential is thereupon placed on the gate circuit of the SCR 48 through the contact set 29. When the SCR 48 fires, sufficient current is drawn through the resistor 51 to blow the fuse 44. The whole system would therefore be shut down to prevent the pool from overflowing by virtue of de-energization of the relay coil 28.

The time constant of the capacitor 39 and the resistor 41 is selected to prevent the contact sets 29 and 30 from closing before the contact sets 26 and 27 for two reasons. First, if the switch 45 is thrown to the on position when the sensing tube 11 is full because the pump 4 is operating, the SCR 48 is prevented from firing on a falsely sensed overflow condition because the relay coil 28 will not have been fully energized by the time the relay coil 25 pulls the contact set 27 which terminates further energization of the relay coil 28. Second, the predetermined difference in energizing times between the relay coils 25 and 28 guards against momentary pulsing of the electrically actuated valve 9 whenever the switch 45 is thrown to the on position when the water level in the sensing tube 11 is at or above the high water level probe 19. Additionally, the time constant of the cpaacitor 52 and the resistor 51 prevents dv/dt firing of the SCR 48 whenever the system is first energized by operating the switch 45. It may be noted that the switch 45, when thrown to its full down position, permits manual actuation of the valve 9 through the contact set 27 and the contact set 30 inasmuch as the coil 28 will be energized thereby.

Certain alternative configurations are contemplated to achieve ease of installation and to decrease the overall system cost. Reference may be taken to FIG. 4 which illustrates a sensing tube 53, corresponding in most details to the sensing tube 11 of FIG. 2, having means for achieving a range of probe level adjustment after installation. A plurality of probes 54 are fixed to one side of a probe mounting block 55 which may be sealingly engaged with a mating piece 56 having a rectangular opening 57 therein such that, when the mounting block 55 is fixed to the mating piece 56 with screws 58 or the like, the probes 54 extend into the interior of the sensing tube 53. Each of the probes 54 presents terminals 59 on the outside surface of the mounting block 55 to which the various conductors 12 may be selectively attached. With this configuration, the vertical position of the sensing tube 53 need not be predetermined to a fine degree of accuracy since the effective level of the various in-circuit probes may be adjusted by connecting the conductors 12 to the terminals 59 which give the desired range of operation.

Figure 5:
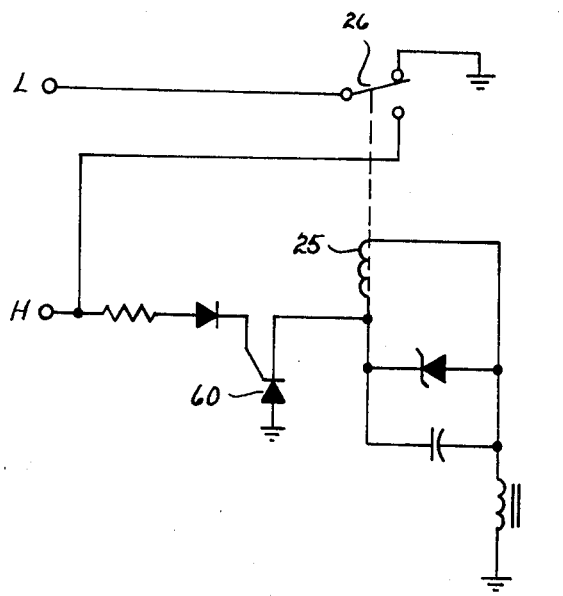
FIG. 5 is a schematic diagram illustrating a simplified control circuit portion.

The circuit described in conjunction with FIG. 3 utilizes two SCR's, 31 and 32, in a latching configuration to provide a safety factor through partial redundancy. The SCR 31 is paralleled by the SCR 32 whenever the water level in the sensing tube 11 is at least as high as the low water level probe 18 except at the instant it first fires. For most of the time during which the relay coil 25 is energized, the SCR 32 alone provides the energy thereto, and therefore the SCR 31 is less likely to fail than the SCR 32. If the SCR 32 should fail, it will be observed that the SCR 31 will function alone to hold the water level near the high water level probe 19 which is a satisfactory level although the loss of the differential level brings about undesirable rapid cycling of the remainder of the circuits including the electrically actuated valve 9. However, it has been demonstrated that the likelihood of failure of a properly chosen SCR is very low, and the circuit simplification illustrated in FIG. 5 utilizing a single SCR 60 to drive the relay coil 25 offers reduced cost at the expense of the above described partial redundancy. Contact set 26, rather than coupling to the redundant SCR circuit, is utilized itself in a latching configuration. Whenever the water level is rising within the sensing tube 11 during a make up cycle, the relay coil 25 will be de-energized until the water level reaches the high water level probe 19 which fires the SCR 60. Contact set 26 then places the high water level probe 19 and the low water level probe 18 into parallel to keep the SCR 60 in the conducting state until such time as the water level within the sensing tube 11 drops below the low water level probe 18 whereupon the SCR 60 is cut off to initiate another make up cycle.

Figure 6:
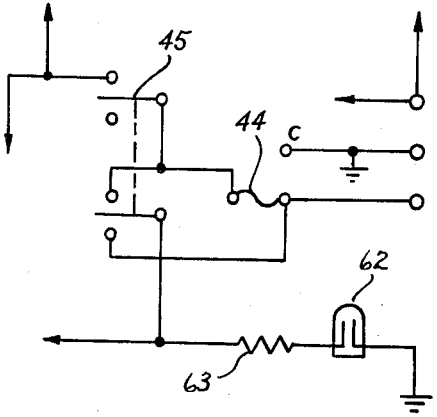
FIG. 6 is a schematic diagram illustrating a modification to the power supply of the level control circuit.

FIG. 6 illustrates a slightly different arrangement for a power switch 61 which permits manual override in the event of a blown fuse. In addition, a neon lamp 62 provides a visual pilot lamp indication that the system is in operation.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

I claim:

1. A system for automatically maintaining the water level in a swimming pool having a suction line, a pump, and a return line comprising:
   a. a make up water line connecting the pool water to a source of water under pressure;
   b. a normally closed, electrically actuated valve disposed in said make up water line;
   c. a level sensing chamber positioned with respect to the swimming pool such that a normal range of pool water level falls intermediate the ends thereof, said sensing tube having a fluid sealed lower end, an upper end thereof having a vent aperture for communicating with the atmosphere;
   d. means placing the interior of said sensing tube in direct liquid communication with said return line;
   e. a plurality of vertically separated level sensing probes extending into the interior of said sensing tube, said plurality of level sensing probes including at least a lowermost common probe, a low water level probe positioned above said common probe, and a high water level probe positioned above said low water level probe;
   f. an overflow sensing probe positioned above said high water level probe;
   g. control means connected to said plurality of probes and to said electrically actuated valve for sensing a first condition in which no conductive path exists between said common probe and said low water level probe and responding to said first condition by energizing said electrically actuated valve to initiate the introduction of make up water into the pool, said control means further sensing a second condition in which a conductive path exists between said common probe and said high water level probe and responding to said second condition by de-energizing said electrically actuated valve to terminate the introduction of make up water into the pool; and
   h. means included in said control means for sensing a third condition in which said control means fails to respond to said second condition and the water level in said sensing tube rises sufficiently to establish a conductive path between said common probe and said overflow probe, said control means including overcurrent breaker means and responding to said third condition by opening said breaker means whereby said control means and said electrically actuated valve are de-energized.

2. A system for automatically maintaining the water level in a swimming pool having a suction line, a pump, and a return line comprising:
   a. make up water line connecting the pool water to a source of water under pressure;

b. a normally closed, electrically actuated valve disposed in said make up water line;
c. level sensing chamber positioned with respect to the swimming pool such that a normal range of pool water level falls intermediate the ends thereof, said sensing tube having a fluid sealed lower end, an upper end thereof having a vent aperture for communicating with the atmosphere;
d. float means in said sensing tube for closing off said vent aperture when the water therein rises to a level proximate said upper end thereof;
e. means placing the interior of said sensing tube in direct liquid communication with said return line;
f. a plurality of vertically separated level sensing probes extending into the interior of said sensing tube, said plurality of level sensing probes including at least a lowermost common probe, a low water level probe positioned above said common probe, and a high water level probe positioned above said low water level probe; and
g. control means connected to said plurality of probes and to said electrically actuated valve for sensing a first condition in which no conductive path exists between said common probe and said low water level probe and responding to said first condition by energizing said electrically actuated valve to initiate the introduction of make up water into the pool, said control means further sensing a second condition in which a conductive path exists between said common probe and said high water level probe and responding to said second condition by de-energizing said electrically actuated valve to terminate the introduction of make up water into the pool.

* * * * *